United States Patent [19]

Hutchisson et al.

[11] Patent Number: 5,608,290
[45] Date of Patent: Mar. 4, 1997

[54] LED FLASHING LANTERN

[75] Inventors: James T. Hutchisson, Bellevue; David K. Straub, Puyallup, both of Wash.

[73] Assignee: Dominion Automotive Group, Inc., Ontario, Canada

[21] Appl. No.: 379,890

[22] Filed: Jan. 26, 1995

[51] Int. Cl.$^6$ ............................... H05B 37/00; F21V 5/00
[52] U.S. Cl. ................... 315/200 A; 315/185 R; 315/360; 362/327; 362/800
[58] Field of Search ........................ 315/200 A, 185 R, 315/360, 362; 362/227, 327, 800

[56] References Cited

U.S. PATENT DOCUMENTS

| | | |
|---|---|---|
| 1,834,041 | 12/1931 | Bartow . |
| 2,740,103 | 3/1956 | Gosswiller ........................... 340/50 |
| 3,266,014 | 8/1966 | Leotta . |
| 4,826,269 | 5/1989 | Steifer et al. . |
| 5,224,773 | 7/1993 | Arimura . |
| 5,252,893 | 6/1994 | Chacham et al. ............... 315/200 A |
| 5,321,591 | 6/1994 | Cimock et al. ............... 315/200 A X |
| 5,519,287 | 5/1996 | Goodale, Jr. et al. ........... 315/200 A |

*Primary Examiner*—Frank Gonzalez
*Assistant Examiner*—Reginald A. Ratliff
*Attorney, Agent, or Firm*—Christensen O'Connor Johnson & Kindness PLLC

[57] ABSTRACT

A flashing lantern (11) capable of emitting light through a 360-degree arc using LEDs as a light source is disclosed. The lantern comprises an array of LEDs (15) positioned in a substantially horizontal plane. An inverted conical reflector (19) is positioned above the array of LEDs (15) such that the apex of the reflector is pointed toward the array of LEDs (15). A fresnel-type lens (17) is positioned around the array of LEDs (15) and the conical reflector (19).

7 Claims, 2 Drawing Sheets

LED FLASHING LANTERN

FIELD OF THE INVENTION

This invention relates to flashing lanterns and, more particularly, to flashing lanterns that incorporate light-emitting diodes (LEDs) as a light source.

BACKGROUND OF THE INVENTION

Flashing lanterns include both flashing beacons and strobe lights. Flashing beacons typically have incandescent or halogen bulbs as their light source, while strobe lights normally incorporate xenon flash tubes. Strobe lights and flashing beacons are used primarily on moving vehicles, such as materials-handling vehicles, construction vehicles, maintenance and utility vehicles, and emergency vehicles. Strobe lights and flashing beacons also have stationary applications, such as on road signaling stands and warning signs, on the visual part of alarm systems, and on mining equipment. Strobe lights and flashing beacons provide visibility, as well as alert people to potentially dangerous situations.

Operationally, flashing lanterns require circuitry that will produce a rapid-rise-time light pulse in order for the lantern to be capable of flashing frequently and distinctly in a given time interval. The flash must also be sufficiently intense to meet the requirements of the intended lighting conditions (full daylight to complete darkness). Further, flashing lanterns must be reliable in harsh weather conditions and, when used on moving objects, flashing lanterns must be vibration resistant. Lastly, it is usually beneficial if the light emitted by a flashing lantern is visible from all sides of the lantern.

Conventional flashing lanterns comprise a flash element or light source, a control circuit, a power source, a base, and a housing. The control circuit produces the fast-rise-time pulse that controls the application of power to the flash element. The power source may be either internal to the lantern housing or external to the lantern housing. The power requirements can range from 12 to 48 volts DC. Suitable power sources are car batteries and portable generators.

The housings of flashing lanterns may include a lens configured to magnify the light emissions therefrom. For example, some flashing lanterns include a fresnel-type lens. While the direction of light emission through the lens is usually outward in a 360-degree arc, some flashing lanterns include diverters that direct emissions along a particular emission path.

In conventional flashing lanterns, the flash element or light source is typically an incandescent bulb or a xenon flash tube. Both types of light sources are the primary cause of lantern failures. In particular, incandescent bulbs have a tendency to burn out due to their wires and filaments becoming brittle with age or weak due to external lantern vibrations. Therefore, incandescent bulbs have a relatively short life. Replacement of incandescent bulbs normally requires some disassembly and, thus, is more expensive and time consuming than desirable. Further, incandescent bulbs utilized in flashing beacons are normally not as bright as desired.

There are also many disadvantages to strobe lights. Xenon flash tubes require high operating voltage, produce UV radiation, and have an operating lit of only 2,000 to 3,000 hours. The high voltage requirements make the design of strobe lights more complicated than desired and can create a safety hazard, due to the possibility of an electrical shock during maintenance.

Lastly, with regard to both flashing beacons and strobe lights, neither produce monochromatic light. Color filters or lenses are required in order to provide colored light emission. Color filters or lenses decrease light transmission and often fade due to weathering and ultraviolet irradiation.

In recent years, a variety of attempts have been made to use LEDs as a light source in flashing beacons. At least four major types of LEDs are available, two of which are typically used in visible light devices—planar and dome LEDs. Due to their structure, the light produced by LEDs changes rapidly in intensity in response to a rapid change in current. LEDs are monochromatic and available in a variety of colors. Thus, using LEDs as a light source eliminates the need for colored filters or lenses, thereby optimizing light transmission while at the same time eliminating the problem of lens or color filter fading. LEDs require low power to operate and have a long operating life—over 100,000 hours for some types.

Although the above characteristics are advantageous commercially, early versions of LEDs had low light-emitting energy and luminance, which made them difficult to see. LEDs have also been difficult to utilize in flashing lanterns due to their inherent structure. More specifically, since the light emission path of a flashing lantern optimally covers an arc of 360 degrees, it is desirable to use an omnidirectional light source placed in the center of the lantern. Bulbs are omnidirectional; LEDs are not. In this regard, LEDs are typically created using flat semiconductor materials, resulting in a light emission path that radiates outwardly from a flat semiconductor plane. It is easier to see an LED looking at it straight on than looking at it from an angle. Therefore, prior art lanterns using LEDs often place the LEDs in a circle, so that the LED light will project outward in a 360-degree range.

One example of such a lantern is disclosed in U.S. Pat. No. 5,224,773 (Arimura) discloses a flashing lantern designed to compensate for the low luminance and poor side visibility of LEDs. Arimura uses a multitude of LEDs arranged about a cylindrical support member. The LEDs project radially from the periphery of the support. This arrangement compensates for the low side visibility of LEDs. The entire support is housed within a magnifying fresnel-type lens that further distributes the light emitted by the LEDs. In order to increase the luminance of the lantern, alternative embodiments are shown that contain multiple layers of LED tings. The result is a complex lantern configuration containing a multitude of LEDs. In addition, the light produced in any one direction is only produced by a few LEDs and, therefore, is not very bright.

Recent improvements in LED technology have resulted in the creation of LEDs having significantly increased luminance. The increased LED luminance decreases the need for a large number of LEDs to produce the high amount of light required of a flashing lantern. Although even modem LEDs do not produce enough light for a single LED to be used in a flashing lantern, it is now possible to produce flashing lanterns with fewer LEDs than in the past. The present invention is directed to providing such a flashing lantern.

SUMMARY OF THE INVENTION

The present invention is a flashing lantern that includes an array of LEDs positioned in a plane so as to emit light in a direction perpendicular to the plane. A reflector is positioned above the plane of the LED array. The reflector is positioned so as to redirect the light produced by the LED array in a particular desired direction. The array of LEDs and the reflector are surrounded by a transparent or opaque magnifying-type lens that concentrates the light produced by the planar array of LEDs in a 360-degree arc. A power source and control circuit are provided to illuminate the LEDs.

In accordance with further aspects of this invention, the reflector is in the form of an inverted cone centrally aligned with the planar LED array.

In accordance with other aspects of this invention, the LED array is circular and the magnifying lens has a cylindrical configuration.

In accordance with still further aspects of this invention, the magnifying lens is a fresnel-type lens.

In accordance with yet other aspects of this invention, the flashing lantern includes a relatively rigid base. The array of LEDs is mounted atop the base. In addition, the base supports the magnifying lens. Preferably, the control circuit for controlling the flashing of the LED array is housed in the base. The power source may be housed in the base or may be external to the lantern.

In accordance with still other aspects of this invention, the LED flashing control circuit includes an electronic switch, preferably in the form of a metal oxide silicon field-effect transistor (MOSFET), a timer, and an on/off switch. The MOSFET is connected in series between the power source and the array of LEDs. When the MOSFET is conducting, current is supplied to the array of LEDs causing light to be produced.

From the foregoing description, it will be appreciated that the present invention provides a new and improved flashing lantern. The invention provides a simple lantern configuration specifically designed for use with LEDs. The present invention's simplified configuration does not require the multitude of LEDs incorporated in previous lanterns, resulting in a lantern that is easier to assemble and install. The present invention efficiently solves the problem of poor side visibility by incorporating an inverted conical reflector that reflects LED light emissions in a full 360-degree arc. The present invention also enjoys a longer life than incandescent lanterns and has improved vibration-resistance characteristics.

DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
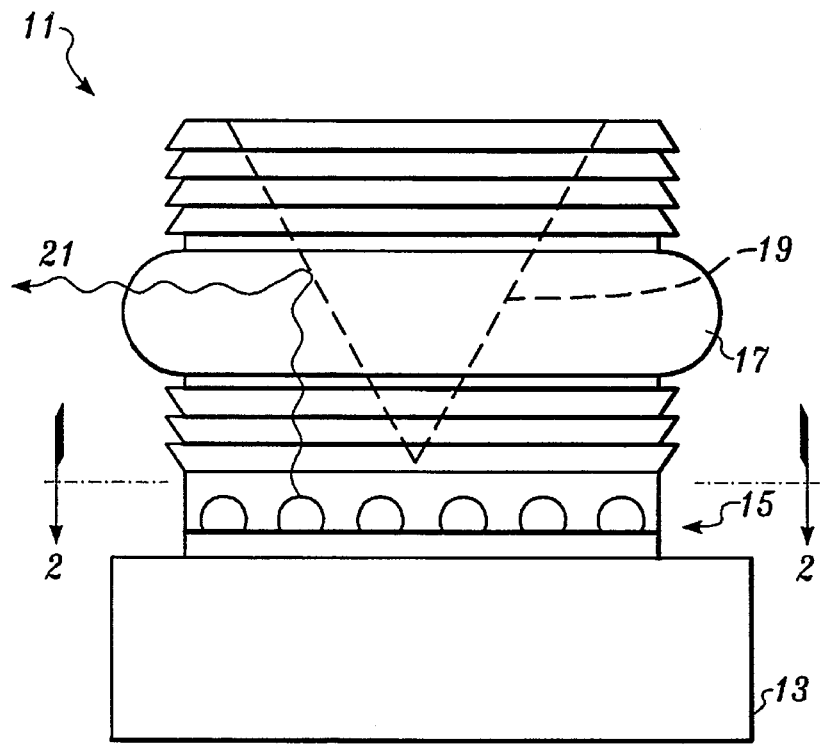
FIG. 1 is a side elevational view of the presently preferred embodiment of the present invention.
Figure 2:
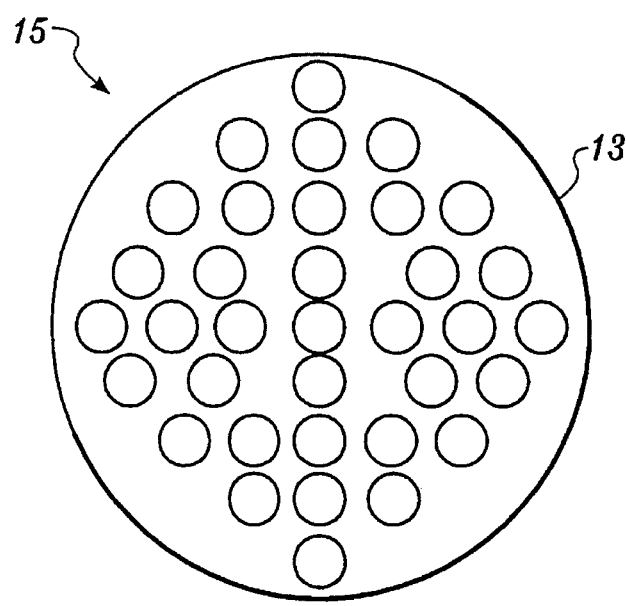
FIG. 2 is a plan view of an array of LEDs included in the embodiment of the invention illustrated in FIG. 1 taken along line 2—2.

FIG. 1 is a side elevational view of the presently preferred embodiment of the invention. More specifically, FIG. 1 illustrates a flashing lantern 11 that comprises a cylindrical base 13, an array of light-emitting diodes (LEDs) 15, a transparent lens 17, and a conical reflector 19. As is best seen in FIG. 2, the array of LEDs 15 is arranged uniformly in a substantially horizontal plane atop the base 13. There are thirty-six LEDs in the array of LEDs 15 of the present embodiment of the invention. Six sets of LEDs are connected in parallel. Within each set, there are six LEDs connected in series.

The transparent lens 17 is cylindrical in shape and includes a fresnel-type lens configuration around its cylindrical periphery. The transparent lens 17 in the preferred embodiment is transparent. In a second embodiment, the transparent lens 17 is opaque. The transparent lens 17 in the preferred embodiment is also a magnifying-type lens. The transparent lens 17 is mounted atop the base 13 such that the lower end of the lens surrounds the array of LEDs 15. Mounted within the transparent lens 17, preferably integral to the upper end of the transparent lens 17, is the conical reflector 19. The conical reflector 19 is inverted and positioned such that the tip of the reflector is centered above the array of LEDs 15. The conical reflector 19 is preferably made of plastic coated with a reflective layer.

Housed in the base 13 is the control circuit 23 that controls the application of power to the array of LEDs 15. The power source 31 may be mounted in the base 13 or may be external to the base 13. In any event, the control circuit 23 and the power source 31 are schematically illustrated in FIG. 3 and described below.

FIG. 2 is a plan view taken along line 2—2 of an array of LEDs 15 suitable for use in the embodiment of the invention shown in FIG. 1. The illustrated array of LEDs 15 comprises two orthogonal lines of LEDs that intersect at their centers, plus a plurality of LEDs located in each quadrant created by the intersecting lines. Obviously, other arrays can be chosen, if desired. There are currently thirty-six LEDs in the present embodiment of the invention. The precise number and orientation of the array of LEDs 15 will, to some extent, depend on the desired direction of light emission. The precise placement of the LEDs on the substantially horizontal plane can also vary. Further, various shapes, sizes, colors, and intensities of LEDs can be used.

In operation, when the array of LEDs 15 is energized, the light emitted by the LEDs impinges on the outer surface of the conical reflector 19. The conical reflector 19 is positioned so as to reflect imaging light outwardly, through the transparent lens 17. An exemplary emission path is shown as item 21. The conical nature of the reflector 19 causes reflected light to be directed outwardly along a 360-degree arcuate path. Obviously, reflectors of other shapes could be chosen, depending upon the desired light emission path.

Figure 3:
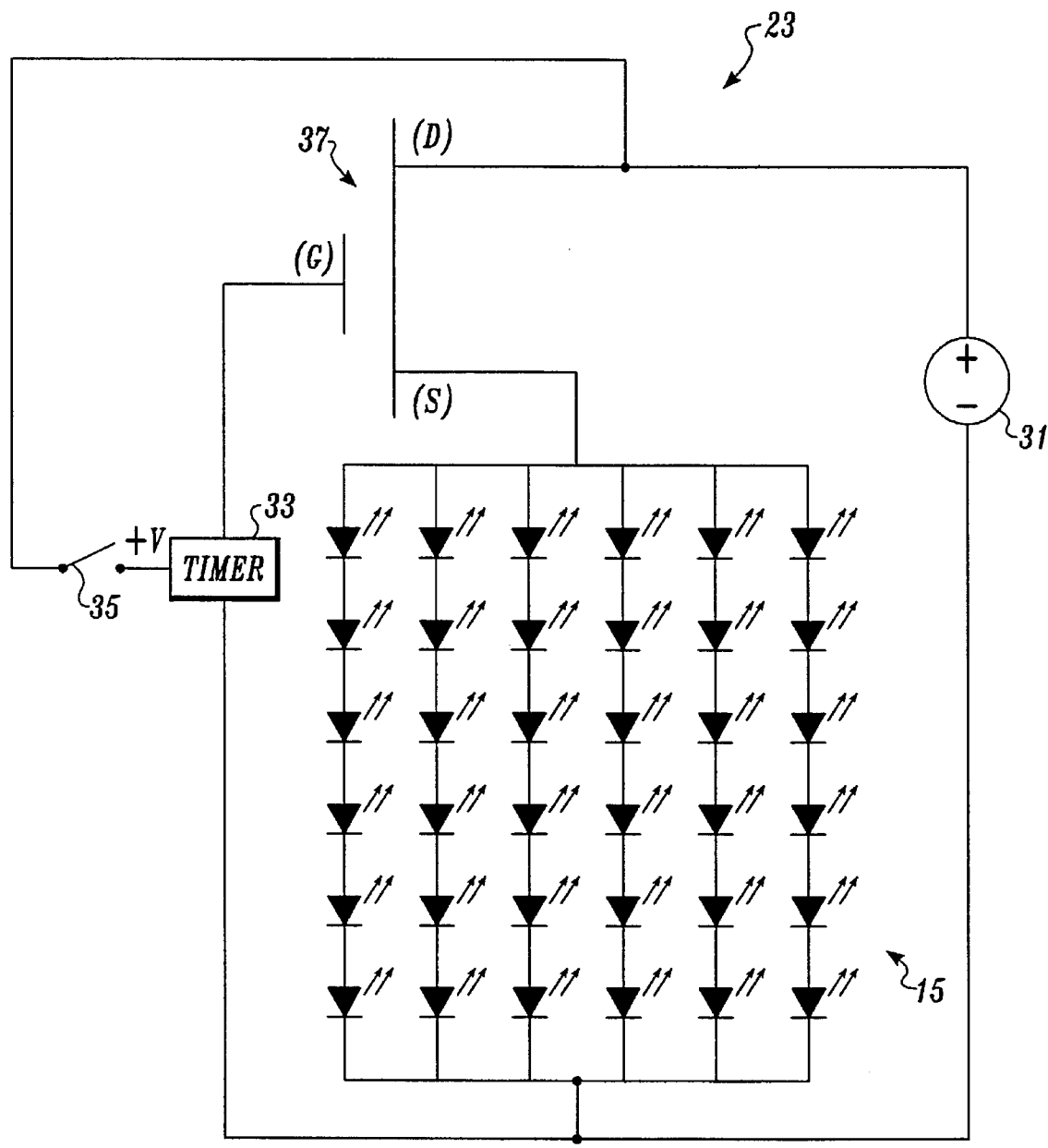
FIG. 3 is a schematic diagram of a control circuit that causes the LEDs to flash periodically.

FIG. 3 is a schematic diagram of a control circuit 23 and a power source 31 suitable for use in the embodiment of the invention shown in FIG. 1. The array of LEDs 15 includes several sets of LEDs connected back to back in series, with the sets connected in parallel, thereby creating a matrix of LEDs. FIG. 3 also includes a DC power source 31, a timer 33, an on/off switch 35, and a metal oxide field-effect transistor (MOSFET) 37. The source terminal (S) of the MOSFET 37 is connected to the anode end of the array of LEDs 15. The cathode end of the array of LEDs 15 is connected to the negative terminal of the DC power source 31. The positive terminal of the DC power source 31 is connected to the drain terminal (D) of the MOSFET 37. Thus, the MOSFET forms a power switch connected in series with the power source 31 and the array of LEDs 15. The output of the timer 33 is connected to the gate (G)

terminal of the MOSFET 37. Power is supplied to the timer 33 from the positive terminal of the DC power source 31 via the on/off switch 35.

In operation, the timer 33 is started by closing the switch 35. The timer 33 supplies a series of pulses to the gate terminal (G) of the MOSFET 37. Each time the timer 33 applies a pulse to the gate(G) of the MOSFET 37, the MOSFET 37 becomes conductive, whereby current flows between the drain (D) and source (S) terminals of the MOSFET 37, energizing the array of LEDs 15. Because LEDs have only a very low voltage drop across them when forward biased, the large currents passing through forward-biased LEDs cause high-intensity light to be emitted by the LEDs. Thus, the pulses produced by the timer 33 cause the array of LEDs 15 to flash brightly on and off. The preferred timer rate lies between 20 and 80 pulses per second.

The flashing lantern 11 is attached to a stationary or moving object via the base 13. When the on/off switch 35 is in the "on" position (i.e., closed) as noted above, the array of LEDs 15 are forward biased by the current flow through the MOSFET 37, causing the diodes to emit light. When the on/off switch 35 is in the "off" position (i.e., open), the current through the MOSFET 37 is substantially zero, whereby the array of LEDs 15 no longer provides illumination. The timer 33 controls the switching on and off of the MOSFET 37. When the array of LEDs 15 produce illumination, the majority of the emitted light radiates away from the individual LEDs toward the inverted conical reflector 19. The LED light is reflected by the inverted conical reflector 19 outwardly through the lens 17 along a 360-degree arc.

While the presently preferred embodiment of the invention has been illustrated and described, it will be appreciated that various changes can be made therein without departing from the spirit and scope of the invention.

The embodiments of the invention in which an exclusive property or privilege is claimed are defined as follows:

1. A flashing lantern comprising:
    (a) an array of light-emitting diodes mounted in a plane for emitting light in a direction perpendicular to the plane;
    (b) a reflector positioned to intersect the light emitted by said array of light-emitting diodes and redirect the light outwardly through a predetermined arc;
    (c) a magnifying lens surrounding said reflector; and
    (d) a control circuit for controlling the application of power to said array of light-emitting diodes such that said array of light-emitting diodes flashes on and off.

2. A flashing lantern as claimed in claim 1, wherein said predetermined arc is a 360-degree arc.

3. A flashing lantern as claimed in claim 2, wherein said reflector is a conical reflector positioned such that the apex of said conical reflector points toward said plane in which said array of light-emitting diodes is mounted.

4. A flashing lantern as claimed in claim 3, wherein said array of light-emitting diodes includes a plurality of sets of light-emitting diodes, said sets being connected in series, said sets including a plurality of light-emitting diodes connected in parallel.

5. A flashing lantern as claimed in claim 4, wherein said control circuit comprises: a metal oxide silicon field-effect transistor (MOSFET) connected in series with said array of light-emitting diodes; a power source connected to said MOSFET and said array of light-emitting diodes to supply power to said array of light-emitting diodes when said MOSFET is conducting; and a timer for supplying pulses to the gate of said MOSFET that cause said MOSFET to become conducting.

6. A flashing lantern as claimed in claim 1, wherein said array of light-emitting diodes includes a plurality of sets of light-emitting diodes, said sets being connected in series, said sets including a plurality of light-emitting diodes connected in parallel.

7. A flashing lantern as claimed in claim 6, wherein said control circuit comprises: a metal oxide silicon field-effect transistor (MOSFET) connected in series with said array of light-emitting diodes; a power source connected to said MOSFET and said array of light-emitting diodes to supply power to said array of light-emitting diodes when said MOSFET is conducting; and a timer for supplying pulses to the gate of said MOSFET that cause said MOSFET to become conducting.

\* \* \* \* \*